T. THOMPSON.

LOCK.

APPLICATION FILED MAY 25, 1921.

Reissued Mar. 14, 1922. 15,307.

3 SHEETS—SHEET 1.

INVENTOR.

THOMAS THOMPSON.

BY HIS ATTORNEY.

James F. Williamson

T. THOMPSON.

LOCK.

APPLICATION FILED MAY 25, 1921.

Reissued Mar. 14, 1922.

15,307.

3 SHEETS—SHEET 2.

INVENTOR.
THOMAS THOMPSON.
BY HIS ATTORNEY.
James F. Williamson

T. THOMPSON.

LOCK.

APPLICATION FILED MAY 25, 1921.

Reissued Mar. 14, 1922. 15,307.

3 SHEETS—SHEET 3.

INVENTOR.
THOMAS THOMPSON.
BY HIS ATTORNEY.
James F. Williamson

UNITED STATES PATENT OFFICE.

THOMAS THOMPSON, OF MAKOTI, NORTH DAKOTA.

LOCK.

15,307. Specification of Reissued Letters Patent. Reissued Mar. 14, 1922.

Original No. 1,311,102, dated July 22, 1919, Serial No. 276,290, filed February 11, 1919. Application for reissue filed May 25, 1921. Serial No. 472,593.

*To all whom it may concern:*

Be it known that I, THOMAS THOMPSON, a citizen of the United States, residing at Makoti, in the county of Ward and State of North Dakota, have invented certain new and useful Improvements in Locks; and I do hereby declare the following to be a full, clear, and exact description of the invention, such as will enable others skilled in the art to which it appertains to make and use the same.

This invention relates to locks, particularly to locks for sliding doors such as are used on box cars, and has for its object the provision of a lock including a stationary keeper member and a pivoted latch member associated with and engageable with the keeper member having a cam movement in relation thereto, whereby movement of the latch member into operative engagement with the keeper member will move the door upon which the lock is disposed into very close engagement with the jamb whereby a tight closure will be provided.

An important object is the provision of a lock of this character embodying a keeper member formed of two sections, one being stationary and the other movable, and further embodying a latch member formed in two sections, one of which is engageable upon the stationary sections of the keeper and the other of which is engaged by the movable section of the keeper, the movable section of the keeper being held in position by a pad lock or by a seal whereby the parts of the lock will be so held in enterengaged position that successful tampering therewith by unauthorized persons will be reduced to the minimum.

A further object is the provision of a lock of this character in which movement of the latch member into engagement with the keeper will cause a cam like action between the latch member and the keeper resulting in firmly wedging the door into its closed position.

Another object is the provision of a lock of this character which will be comparatively simple and inexpensive in manufacture, secure in its holding properties, highly efficient and durable in service, and a general improvement of the art.

With the above and other objects and advantages in view, the invention consists in the details of construction to be hereinafter more fully described and claimed and illustrated in the accompanying drawings in which:—

Figure 1:
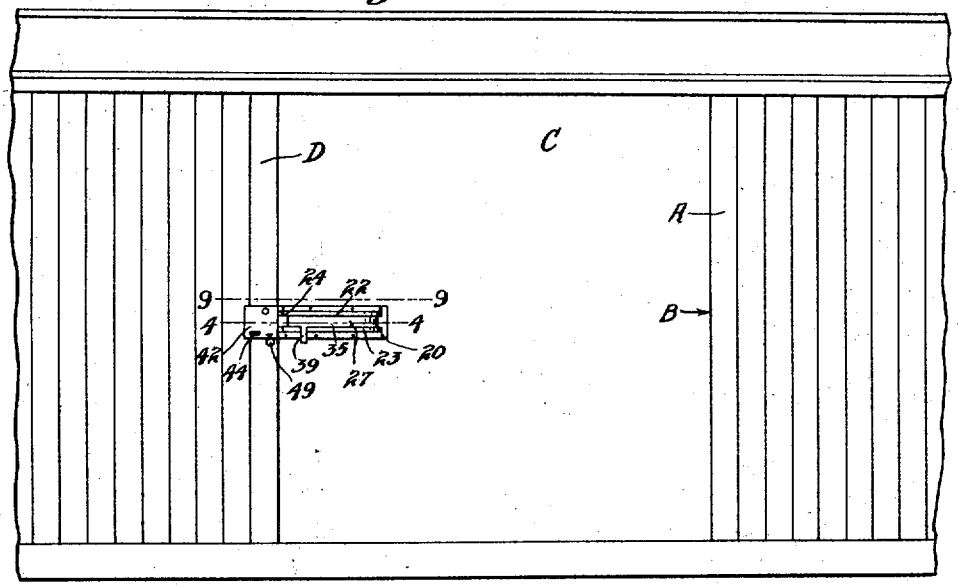
Figure 1 is a front elevation of a door and its jamb having my lock applied thereto, the lock being in its closed position.

Referring more particularly to the drawings the letter A designates the side of a box car or building provided with a door opening B closable by a sliding door C supported in any suitable trackways.

In carrying out my invention I provide upon the jamb D a keeper member designated broadly by the numeral 15 comprising a flat base portion 16 having extending therefrom a curved head 17 undercut as shown at 18 adjacent the base 16 to provide a projecting portion 19.

Secured upon the door C is a latch casing designated broadly by the numeral 20 comprising a back wall 21 from which extend side walls 22 and 23. The casing 20 is disposed in alinement with the keeper 15 and has one end terminating at the edge of the door C. The ends of the side walls 22 and 23 adjacent the keeper 15 are provided with undercut notches 24 for a purpose to be hereinafter described. Pivoted between the other ends of the side walls 22 and 23 as shown at 25, is a latch member including two sections 26 and 27.

The latch member 26 includes a rectangular bar 28 disposable between the side walls 22 and 23 of the latch casing 20 and further includes a substantially rectangular head 29 secured upon the end of the bar 28 adjacent the keeper 15. The underside of the head 29 is provided with a recess 30 having curved walls, as shown, the recess being of greater dimensions than the keeper 15 and being so formed as to provide a projecting portion 31 adapted to engage within the undercut portion 18 of the keeper. Secured upon the underside of the bar 28 at a point spaced from the head 29 is a substantially frusto-pyramidal block 32 disposable within an opening 33 in the back wall 21 of the latch member casing and engageable within correspondingly formed recess 34 having undercut sides as shown.

The section 27 of the latch member includes a bar 35 provided at one end with a centrally disposed tongue 36 through which the pivot pin 25 passes and which is disposed within a bifurcation 37 in the outer end of the bar 28. The sections 26 and 27 of the latch member are connected by a pivot pin 38 which extends through the bifurcated portion of the bar 28 and through the tongue 36 on the section 27. The pivotal connection 38 between the sections 26 and 27 of the latch member is such that when the bar 35 is swung toward or away from the bar 28 the bar 28 will be moved in a rectilinear course as will be hereinafter explained. Extending from one side of the bar 35 is a lug 39 serving as a handle and engageable within a notch 40 formed in the side wall 23 of the latch casing. The free end of the bar 35 is cut away as shown at 41 so that the major portion thereof will be flush with the edges of the notches 24 in the side walls 22 and 23.

In order that the section 27 of the latch member may be held associated with the section 26, I provide upon the head 29 of the bar 28 an auxiliary keeper or locking plate 42 pivotally connected therewith as shown at 43 and provided with an operating handle 44. The plate 42 is eccentrically pivoted upon the head 29 and has one end portion so formed as to provide a central portion 45 engageable with the cut away portion 41 of the bar 35 and beveled portions 46 engageable with the undercut notches 24 in the side walls 22 and 23 of the latch casing.

The operation of the lock is as follows:—

Figure 4:
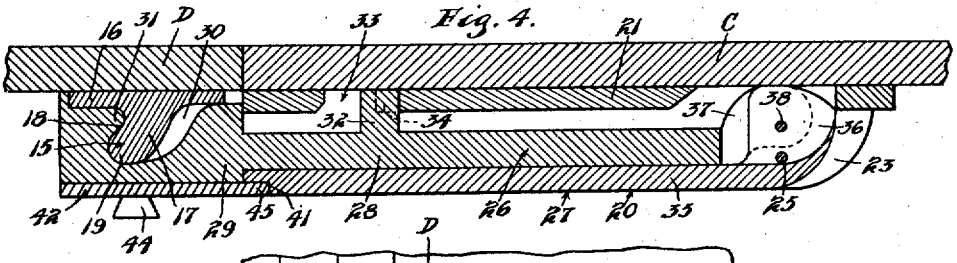
Fig. 4 is a longitudinal sectional view on the line 4—4 of Fig. 1.
Figure 2:
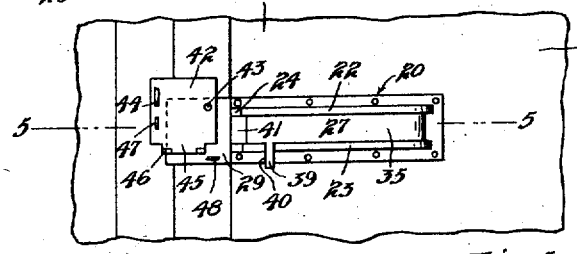
Fig. 2 is a similar view showing the auxiliary keeper member moved into its latch releasing position.
Figure 5:
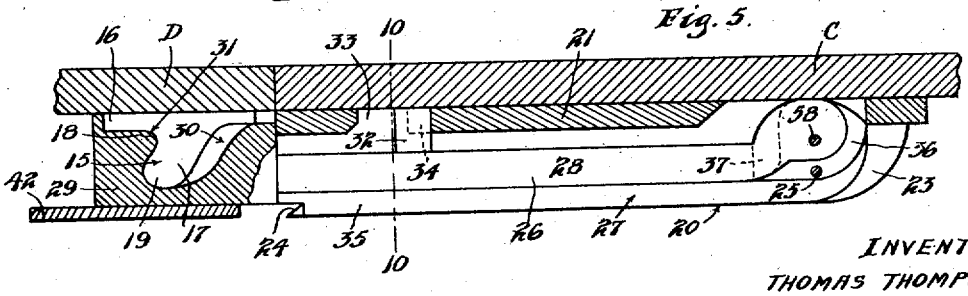
Fig. 5 is a similar view on the line 5—5 of Fig. 2.
Figure 6:
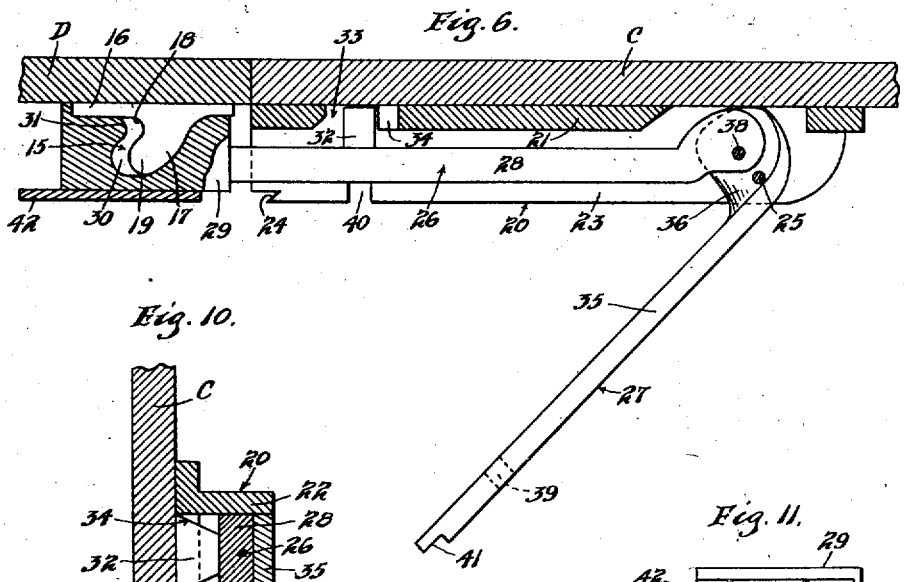
Fig. 6 is a similar view on the line 6—6 of Fig. 3.
Figure 10:
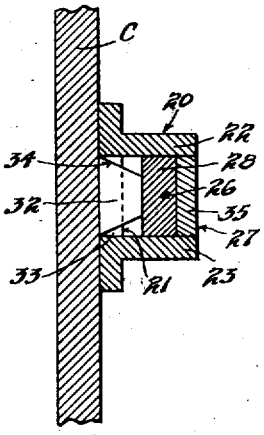
Fig. 10 is a cross sectional view, on the line 10—10 of Fig. 5.
Figure 11:
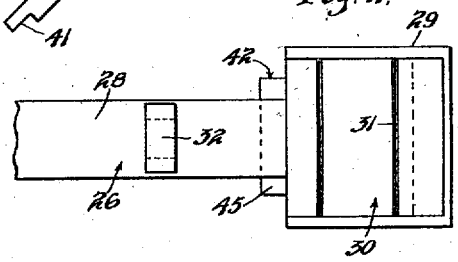
Fig. 11 is a fragmentary elevation of the inner face of the latch member.
Figure 3:
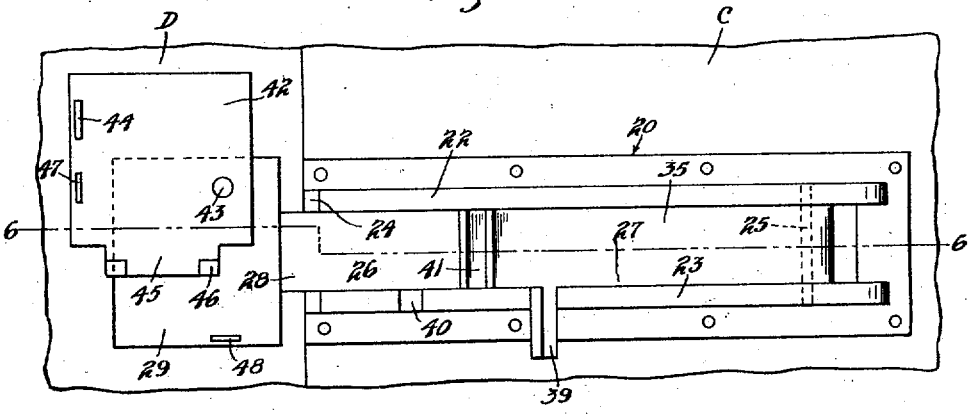
Fig. 3 is a similar view showing one section of the latch member moved to its open position and showing the door initially moved.

With the parts of the lock disposed in the position shown in Fig. 1 of the drawings, in order to open the door, it is first necessary to grasp the handle 44 and swing the plate 42 upon its pivot 43 until its end portions 45 and 46 are disengaged from the cut away portions 41 and notches 24 respectively, as shown in Fig. 2. The operator then grasps the lug 39 and swings the bar 35 outwardly away from the bar 28 into the position shown in Figs. 3 and 6 of the drawing. Owing to the peculiar arrangement of the pivot pin 38 connecting the sections 26 and 27 of a latch member, outward movement of the bar 35 in respect to the bar 28 will result in a rectilinear movement of the bar 28 over the face of the door C. As this rectilinear movement of the bar 28 is limited by the engagement of the wall of the recess 30 with the head 17 of the keeper 15, the door C will be moved a slight distance away from the jamb B as shown in Figs. 2 and 4 of the drawings. The bar 28 is however moved a sufficient degree that the projecting portion 31 within the recess 30 in the head 29 will be disengaged from the undercut portion 18 of the head 17 of the keeper 15. Continued outward swinging movement of the bar 35 upon the pivot pin 25 will result in outward swinging movement of the bar 28 so that the head 29 will be entirely disengaged from the keeper 15. The parts will then assume the position shown in Figs. 7 and 8 of the drawings and the door C may then be slid to its open position. It will, of course, be seen that when the bar 28 is given its rectilinear movement, the block 32 will be moved out of engagement within the recess 34 in the back wall 21 of the latch casing and will be disposed within the relatively large opening 33 in the back wall.

Figure 7:
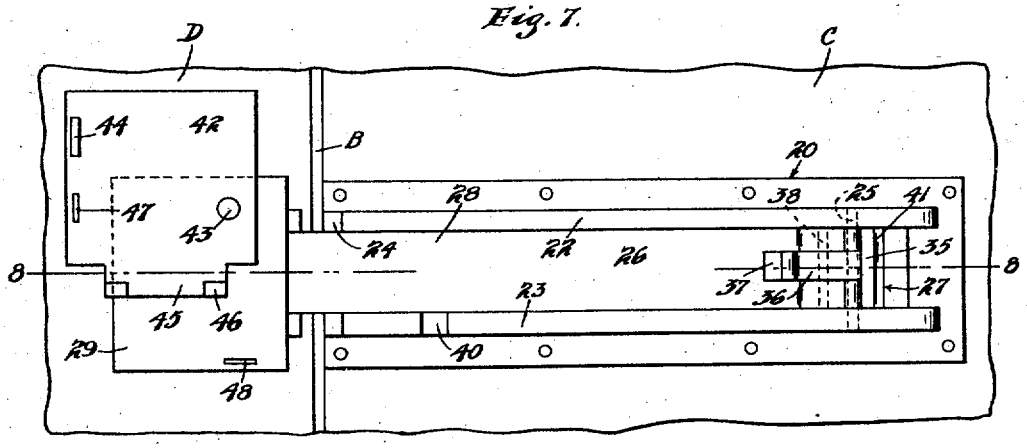
Fig. 7 is a front elevation similar to Fig. 1 showing the latch member swung to its entirely disengaged position.
Figure 8:
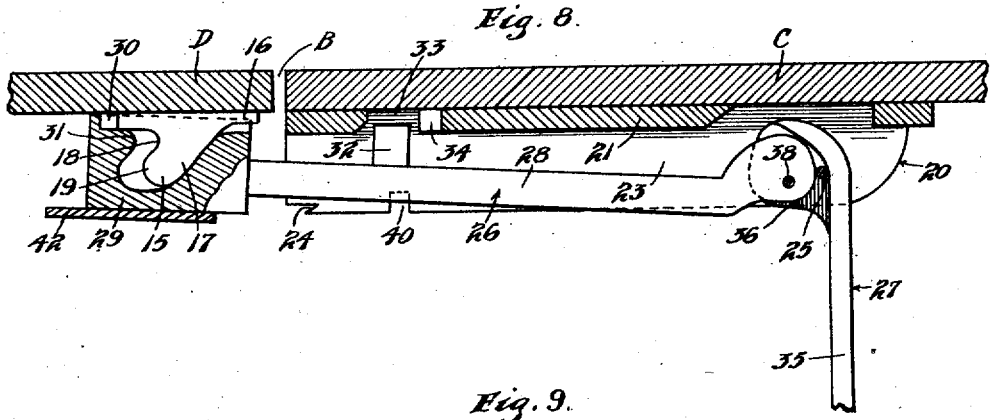
Fig. 8 is a longitudinal sectional view on the line 8—8 of Fig. 7.
Figure 9:
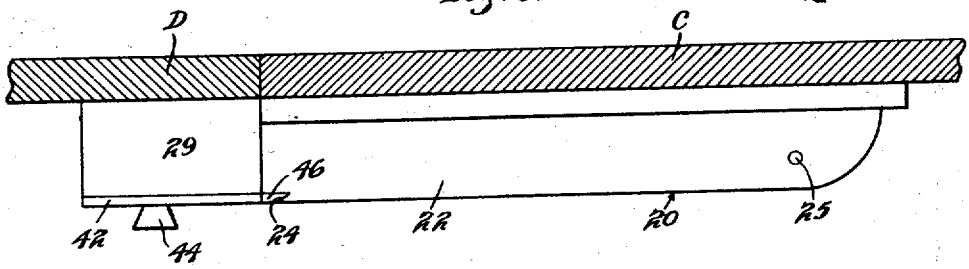
Fig. 9 is a sectional view through the door on the line 9—9 of Fig. 1 showing the locking mechanism in side elevation.

The door being open and the parts of the lock being disposed in the position shown in Figs. 7 and 8 of the drawings, in order to lock the door it is first necessary to slide the door into substantially close engagement with the jamb B. The bar 28 is then swung upon the pivot pin 38 until the head 29 is disposed over the keeper 15. At this time, the projecting portion 31 within the recess of the head 29 will be disposed in proximity to, but out of contact with the projection 19 of the head 17 of the keeper. The operator then grasps the lug 39 and swings the bar 35 until it lies upon the bar 28, whereupon the eccentric pivot connection 38 between the bars 28 and 35 will result in rectilinear movement of the bar 28 over the face of the door, the head 29 being moved toward the edge of the door. This movement of the head 29 causes the projecting portion 31 within the recess 30 to engage within the undercut portion 18 of the keeper head 17. The projecting portion 19 of the head is then disposed within the recess 30 and the head 29 is fixed in relation to the keeper. When the bar 35 is disposed in close engagement upon the bar 28, the lug 39 will be seated within the notch 40 in the side wall 23 of the latch casing and the cutaway portion 41 at the free end of the bar 35 will be in substantial alinement with the notches 24 in the side walls 22 and 23. The operator then grasps the handle 44 upon the locking plate 42 and swings the locking plate upon its pivot 43 until its beveled portions 46 are engaged within the notches 24 and its central portion 45 abuts against the edge of the cut away portion 41 of the bar 35. Further movement of the plate 42 is prevented.

In order to secure the locking plate 42 upon the head 29 so that it may not be moved by an unauthorized person, I provide the plate 42 with a slot or hole 47 registering with a similar slot or hole 48 in the edge of the head 29 when the plate 42 is swung to its locking position. The usual seal 49, or a pad lock is desired, if then inserted and secured through the holes 47 and 48.

From the foregoing description and a study of the drawings it will be apparent that I have thus provided a lock whereby a sliding door such as used on box cars or in other locations may be quickly and easily locked to prevent the entrance of unauthorized persons, or unlocked by the proper parties, the lock providing means whereby a seal may be secured in respect thereto and including the provision of a latching member having rectilinear movement in respect to a keeper member whereby a cam effect will be produced for urging the door to its closed position for effecting a tight closure.

While I have shown and described the preferred embodiment of my invention, it will, of course, be understood that I reserve the right to make such changes in the form, construction and arrangement of parts as will not depart from the spirit of the invention nor the scope of the subjoined claims.

What is claimed is:—

1. A lock having in combination, a keeper, a latch adapted to swing over said keeper and be brought into locking relation thereto by a longitudinal movement of said latch, and means overlying said latch for swinging said latch over the keeper and moving the same longitudinally into locking engagement therewith.

2. A lock having in combination, a keeper, a casing, a pivoted latch adapted to engage said keeper, means on said latch adapted to engage said casing, and means for swinging said latch and for moving the same longitudinally to engage said keeper and said casing.

3. A lock having in combination, a keeper, a casing having substantially parallel sides, a bar pivoted therein, a latch eccentrically pivoted to said bar, said latch and bar adapted to be disposed in said casing, said latch having a head extending beyond the casing and swinging in a plane parallel to said sides adapted to engage said keeper, and said latch being swingingly and longitudinally movable by said bar.

4. The structure set forth in claim 3, said head on said latch having means thereon adapted to be brought into locking engagement with said casing.

5. The structure set forth in claim 3, said head on the latch having means adapted to inter-engage with the sides of said casing.

6. The structure set forth in claim 3, said bar lying flush with the top of the casing and said head on the latch having its sides flush with the sides of the casing when said lock is in closed position.

7. A lock having in combination, a keeper, a pivoted latch adapted to inter-engage therewith, and means normally overlying said latch movable in one direction to swing said latch over said keeper and to move the same longitudinally to engage said keeper and movable in the opposite direction to move said latch longitudinally and to lift the same from said keeper.

8. A lock having in combination, a keeper, a pivoted latch adapted to inter-engage therewith, and a bar to which said latch is eccentrically pivoted adapted when swinging in one direction to swing said latch over said keeper and to move the same longitudinally into engagement therewith, and when swung in the other direction, to move the bar longitudinally in a reverse direction, and also having a projection thereon adapted to engage and lift said latch from said keeper.

9. A lock having in combination, a keeper, a casing, a bar pivoted to said casing, a latch eccentrically pivoted to said bar at one end and adapted to engage said keeper with its other end, the end of said bar extending under the said latch, whereby the latch will be moved longitudinally and lifted when said bar is swung upwardly.

10. A lock having in combination, a keeper, a casing, a pivoted latch member secured in said casing adapted to engage with said keeper, and a head in said latch adapted to enclose said keeper and align with the casing in close proximity thereto.

11. A sliding door lock comprising a keeper secured upon the door jamb and provided with an undercut portion, a casing secured upon the door, a latch member disposed for pivotal and sliding movement within said casing, a head carried by said latch member and provided with a recess for the accommodation of said keeper, a projection within said recess, means pivoted within said casing for imparting a rectilinear movement to said latch member whereby said projection will be engaged within the undercut portion of said keeper, and means carried by said head and engageable with said last named means for preventing movement of said latch member operating means.

12. A sliding door lock comprising a keeper secured upon the door jamb and provided with an undercut portion, a casing secured upon the door, a latch member disposed within said casing and arranged for pivotal and sliding movement, a head carried by said latch member and provided with a recess for the accommodation of said keeper, a projection within said recess, a bar pivotally connected with said casing and with said latch member whereby rectilinear movement may be imparted to said latch member to engage said projection within the undercut portion of said keeper, and means for preventing movement of said bar.

13. A sliding door lock comprising a keeper secured upon the door jamb and provided with an undercut portion, a casing secured upon the door, a latch member arranged for pivotal and sliding movement within said casing, a head carried by said latch member and provided with a recess for the accommodation of said keeper, a projection within said recess, a bar pivoted within said casing and connected with said latch member, outward swinging of said bar causing rectilinear movement of said latch member over the face of the door whereby said projection will be engaged within the undercut portion of said keeper, and means carried by said head and engageable with said bar whereby outward swinging of said bar will be prevented.

14. A sliding door lock comprising a keeper secured upon the door jamb and provided with an undercut portion, a casing secured upon the door, a latch member disposed for pivotal and sliding movement within said casing, a projection on said latch member, a bar pivoted within said casing and pivotally connected with said latch member whereby outward movement of said bar will impart longitudinal movement to said latch member to engage said projection within the undercut portion of said keeper, and a locking plate pivoted upon said latch member and movable into engagement with said bar whereby outward movement of said bar will be prevented.

In testimony whereof I affix my signature.

THOMAS THOMPSON.